(12) United States Patent
Tokito et al.

(10) Patent No.: US 10,112,493 B2
(45) Date of Patent: Oct. 30, 2018

(54) CHARGE-DISCHARGE CONTROL DEVICE

(71) Applicant: Mitsubishi Electric Corporation, Chiyoda-ku, Tokyo (JP)

(72) Inventors: Kosuke Tokito, Tokyo (JP); Ryo Yokozutsumi, Tokyo (JP); Hidetoshi Kitanaka, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 35 days.

(21) Appl. No.: 15/518,366

(22) PCT Filed: Oct. 17, 2014

(86) PCT No.: PCT/JP2014/077687
§ 371 (c)(1),
(2) Date: Apr. 11, 2017

(87) PCT Pub. No.: WO2016/059720
PCT Pub. Date: Apr. 21, 2016

(65) Prior Publication Data
US 2017/0305285 A1 Oct. 26, 2017

(51) Int. Cl.
*H02J 7/00* (2006.01)
*B60L 11/18* (2006.01)
(Continued)

(52) U.S. Cl.
CPC ......... *B60L 11/1811* (2013.01); *B60L 3/0046* (2013.01); *B60L 11/1842* (2013.01);
(Continued)

(58) Field of Classification Search
CPC .................. B60L 11/1811; B60L 11/1842
(Continued)

(56) References Cited

U.S. PATENT DOCUMENTS

| 7,015,676 B2 | 3/2006 | Kohama et al. |
| 8,035,252 B2 | 10/2011 | Ichikawa et al. |

(Continued)

FOREIGN PATENT DOCUMENTS

| EP | 2061128 A1 | 5/2009 |
| JP | 8-17474 A | 1/1996 |

(Continued)

OTHER PUBLICATIONS

Extended European Search Report dated Apr. 4, 2018, issued by the European Patent Office in corresponding European Application No. 14904173.3. (6 pages).

(Continued)

*Primary Examiner* — M'Baye Diao
(74) *Attorney, Agent, or Firm* — Buchanan Ingersoll & Rooney PC

(57) ABSTRACT

A charge-discharge control device (1) charges and discharges power storage devices (13, 23) through control of a converter (11) by a controller (14) and through control of a converter (21) by a controller (24). When the charge-discharge control device (1) acquires no warming-up operation command, the charge-discharge control device (1) charges the power storage devices (13, 23). When the charge-discharge control device (1) acquires a warming-up operation command, the charge-discharge control device (1) repeats warming-up operation to discharge one of the power storage devices (13, 23) and charge the other of the power storage devices (13, 23) using the discharged power so that the power storage devices (13, 23) alternately discharge.

12 Claims, 10 Drawing Sheets

(51) Int. Cl.
*H02J 7/02* (2016.01)
*H01M 10/625* (2014.01)
*H01M 10/615* (2014.01)
*H01M 10/633* (2014.01)
*B60L 3/00* (2006.01)
*H01M 10/42* (2006.01)
*H01M 10/44* (2006.01)

(52) U.S. Cl.
CPC ....... *B60L 11/1862* (2013.01); *B60L 11/1872* (2013.01); *H01M 10/425* (2013.01); *H01M 10/441* (2013.01); *H01M 10/443* (2013.01); *H01M 10/615* (2015.04); *H01M 10/625* (2015.04); *H01M 10/633* (2015.04); *H02J 7/00* (2013.01); *H02J 7/02* (2013.01); *B60L 2200/26* (2013.01); *B60L 2240/545* (2013.01); *Y02T 10/7005* (2013.01)

(58) Field of Classification Search
USPC .......................................................... 320/128
See application file for complete search history.

(56) References Cited

U.S. PATENT DOCUMENTS

| | | | | |
|---|---|---|---|---|
| 8,810,203 | B2 * | 8/2014 | Abe | .................. H01M 10/3909 320/132 |
| 2003/0231005 | A1 | 12/2003 | Kohama et al. | |
| 2009/0179616 | A1 | 7/2009 | Ichikawa et al. | |
| 2009/0195067 | A1 | 8/2009 | Ichikawa et al. | |
| 2010/0001583 | A1 | 1/2010 | Ichikawa | |

FOREIGN PATENT DOCUMENTS

| | | | |
|---|---|---|---|
| JP | 2005-332777 | A | 12/2005 |
| JP | 2006-238543 | A | 9/2006 |
| JP | 2008-22589 | A | 1/2008 |
| JP | 2008-042980 | A | 2/2008 |
| JP | 2008-109756 | A | 5/2008 |
| JP | 2009-078807 | A | 4/2009 |
| JP | 2013-89296 | A | 5/2013 |
| JP | 2014-193040 | A | 10/2014 |

OTHER PUBLICATIONS

International Search Report (PCT/ISA/210) dated Nov. 11, 2014, by the Japanese Patent Office as the International Searching Authority for International Application No. PCT/JP2014/077687.

Written Opinion (PCT/ISA/237) dated Nov. 11, 2014, by the Japanese Patent Office as the International Searching Authority for International Application No. PCT/JP2014/077687.

Japanese Office Action (Notification of Reasons for Rejection) dated Mar. 21, 2017, issued in the corresponding Japanese Patent Application No. 2016-553943. (8 pages) (partial English translation).

* cited by examiner

CHARGE-DISCHARGE CONTROL DEVICE

TECHNICAL FIELD

The present disclosure relates to a charge-discharge control device.

BACKGROUND ART

Electric railway vehicles (electric vehicles, hereafter) equipped with a power storage device run on non-electrified routes, where no overhead power lines are installed, by means of a motor driven using power output from the power storage device. As the power storage device, for example, a secondary battery, such as a nickel-hydrogen battery or a lithium ion battery, or an electric double-layer capacitor is used. In a low temperature conditions, the internal resistance of the power storage device increases, and therefore the power dischargeable from the power storage device may possibly decrease. Thus techniques have been developed for raising the temperature of the power storage device.

A railway vehicle drive control device disclosed in Patent Literature 1 expedites rise in the temperature of a storage battery, without operating an inverter by repeatedly charging the storage battery using engine power generation and discharging the storage battery to drive a power generator so as to absorb a load at the engine brake.

CITATION LIST

Patent Literature

Patent Literature 1: Unexamined Japanese Patent Application Kokai Publication No. 2008-042980.

SUMMARY OF INVENTION

Technical Problem

The railway vehicle drive control device disclosed in the Patent Literature 1 requires an engine and a power generator for a discharge. Therefore, the technique disclosed in the Patent Literature 1 is not applicable to electric vehicles on which power storage devices are mounted.

The present disclosure is made with the view of the above situation and an objective of the disclosure is to enable to raise the temperatures of a power storage device with a more simplified configuration.

Solution to Problem

In order to achieve the above objective, a charge-discharge control device of the present disclosure includes multiple power converters, power storage devices connected to an output side of the power converters and provided one for each of the power converters, and a controller. A power source is connected to an input side of the power converters, positive electrodes on the input side of the power converters are connected to each other, and negative electrodes on the input side are connected to each other. The power converters are capable of two-way power conversion. The controller charges or discharges a power storage device of the power storage devices connected to the power converters by controlling output currents of the power converters. The controller charges each of the power storage devices by supplying, to each of the power storage devices, power acquired from the power source via each of the power converters when the controller acquires no warming-up operation command, and when the controller acquires a warming-up operation command, the controller performs a warming-up operation to discharge at least one of the power storage devices and charge at least one other of the power storage devices using power discharged from the at least one of the power storage devices and repeatedly performs the warming-up operation while changing at least any of the power storage devices among the power storage devices to discharge and the power storage devices to charge.

Advantageous Effects of Invention

According to the present disclosure, power is given/received between multiple power storage devices by repeatedly charging/discharging the power storage devices, and thus the present disclosure makes it possible to raise temperatures of the power storage devices with a more simplified configuration.

DESCRIPTION OF EMBODIMENTS

Embodiments of the present disclosure are described in detail below with reference to figures. In the figures, components that are the same or equivalent are assigned the same reference signs.

Embodiment 1

Figure 1:
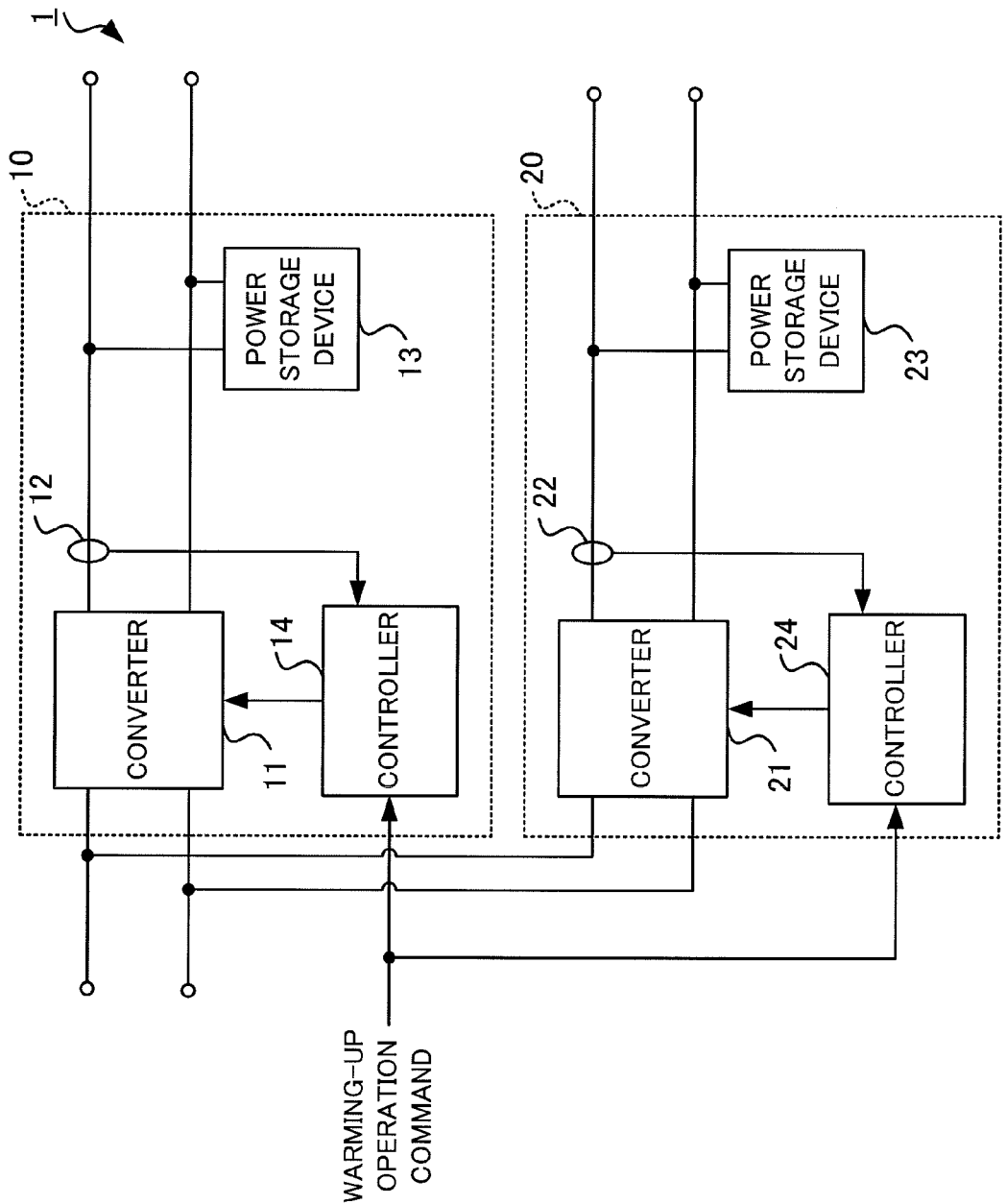
FIG. 1 is a block diagram illustrating an example configuration of a charge-discharge control device according to Embodiment 1 of the present disclosure.

FIG. 1 is a block diagram illustrating an example configuration of a charge-discharge control device according to Embodiment 1 of the present disclosure. A charge-discharge control device 1 converts input power as necessary and supplies the converted power to a load device connected to the output side. Moreover, the charge-discharge control device 1 charges power storage devices 13 and 23 when the charge-discharge control device 1 acquires no warming-up operation command, and when the charge-discharge control device 1 acquires a warming-up operation command is acquired, the charge-discharge control device 1 repeatedly performs a warming-up operation to discharge one of the power storage devices 13 and 23 and charge the other of the power storage devices 13 and 23 using the discharged power so that the power storage devices 13 and 23 alternately discharge. The charge-discharge control device 1 raises temperatures of the power storage devices 13 and 23 by repeating the warming-up operation so that power is given/received between the power storage devices 13 and 23.

In the example of FIG. 1, the charge-discharge control device 1 has a first control device 10 and a second control device 20. The number of control devices included in the charge-discharge control devices 1 is any number of two or greater. The first control device 10 and the second control device 20 have the same configuration and therefore, components of the first control device 10 are described.

The first control device 10 includes a power converter capable of two-way power conversion. In the example of FIG. 1, the first control device 10 includes a converter 11 as the power converter. The first control device 10 includes a current sensor 12 detecting output current of the converter 11, a power storage device 13 charged with power output by the converter 11, and a controller 14 controlling the converter 11. The controller 14 includes a processor including a central processing unit (CPU), an internal memory, and the like, and a memory including a random access memory (RAM), a flash memory, and the like. The controller 14 executes control programs stored in the memory and controls the converter 11.

A positive electrode on an input side of the converter 11 and a positive electrode on the input side of a converter 21 are connected to each other. The negative electrode on the input side of the converter 11 and the negative electrode on the input side of the converter 21 are connected to each other. A not-shown power source is connected to the input side of the converter 11. The power storage device 13 and a not-shown load device are connected to the output side of the converter 11. The power storage device 13 has a secondary battery, an electric double-layer capacitor, or the like, and can store power necessary for driving the load device.

The controller 14 outputs a gate signal for on/off switching of a switching element of the converter 11 based on the output current of the converter 11 detected by the current sensor 12. The controller 14 controls the output current of the converter 11 to charge and discharge the power storage device 13.

Figure 2:
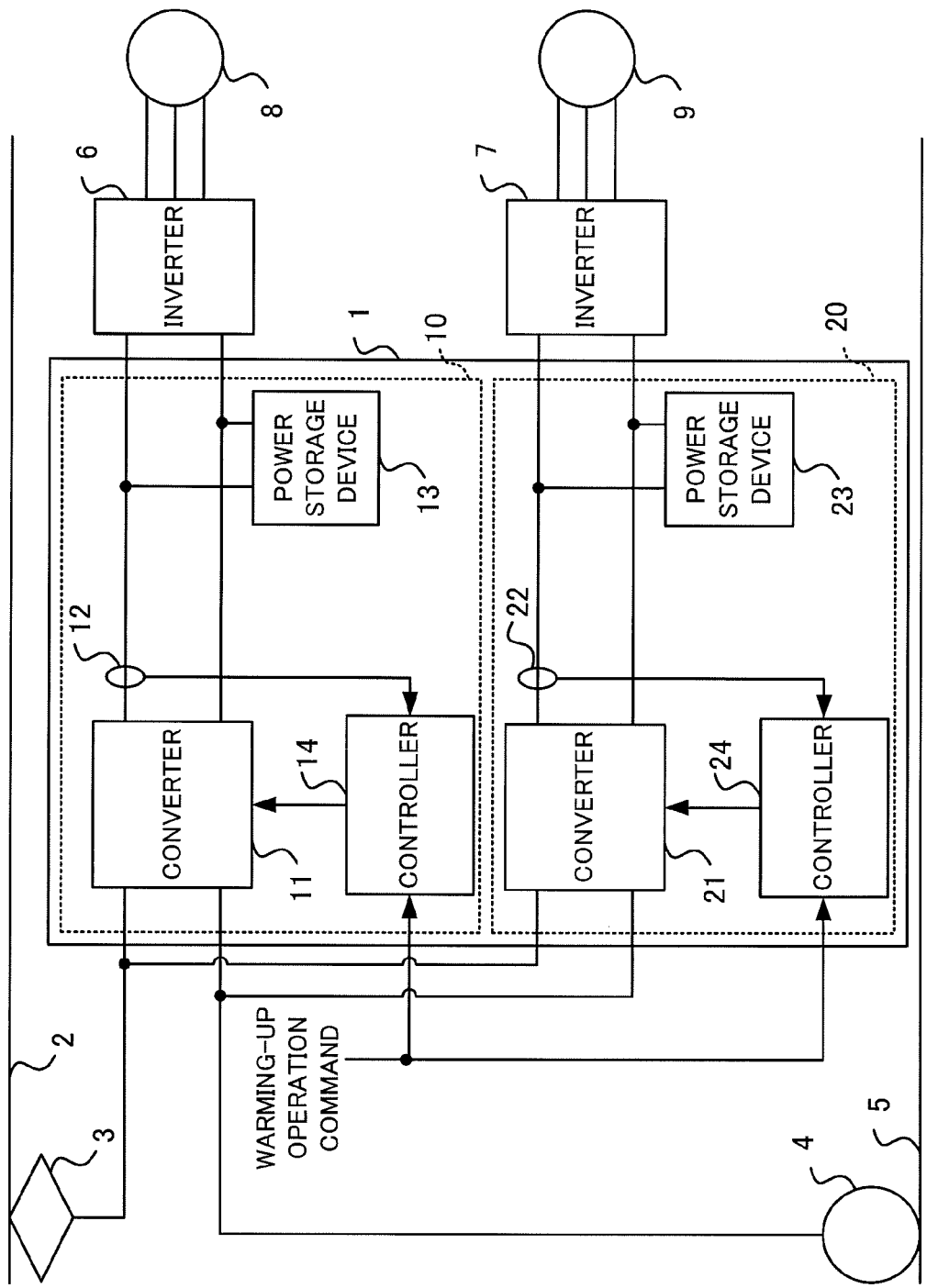
FIG. 2 is a block diagram illustrating an example of mounting the charge-discharge control device according to Embodiment 1 on an electric railway vehicle.

FIG. 2 is a block diagram illustrating an example of mounting the charge-discharge control device according to Embodiment 1 on an electric railway vehicle. The charge-discharge control device 1 is mounted on, for example, an electric railway vehicle (the electric vehicle, hereafter). Power supplied from a power substation that is the not-shown power source is supplied to the converters 11 and 21 via an overhead power line 2 and a current collector 3 such as a pantograph. A return current from the converters 11 and 21 is returned to the negative electrode side of the power substation via an electric vehicle wheel 4 and a rail 5.

The converter 11 may include any component. The converter 11 performs DC (direct current)-DC conversion in which, for example, a direct-current voltage of approximately 1500 V is converted to a voltage of approximately 700 V. Moreover, in alternating current electrified sections, the converter 11 performs AC (alternating current)-DC conversion. In such a case, it is preferable to use a pulse width modulation (PWM) converter as the converter 11.

Inverters 6 and 7 are connected to the output side of the converters 11 and 21, respectively. The inverters 6 and 7 perform DC-AC conversion. It is preferable to use a voltage-type PWM inverter as the inverters 6 and 7. Electric motors 8 and 9 are connected to the output side of the inverters 6 and 7, respectively. As the electric motors 8 and 9 are driven by output of the inverters 6 and 7, the driving force of the electric vehicle is obtained.

When the warming-up operation is not performed, in other words during a normal operation, the power storage devices 13 and 23 are charged with power acquired via the overhead power line 2 and the current collector 3, and the inverters 6 and 7 are driven. Any method of entering a warming-up operation command into the charge-discharge control device 1 may be used. The warming-up operation starts on the electric vehicle on which the charge-discharge control device 1 is mounted when a warming-up operation switch provided at a driving cab is operated by an operator, for example, before starting the electric vehicle operation. When the warming-up operation is performed before starting the electric vehicle operation, the inverters 6 and 7 are at halt. However, the warming-up operation may be performed while the inverters 6 and 7 are driven. The first control device 10 and the second control device 20 may be mounted on the same electric vehicle or may be mounted on different electric vehicles as long as power can be given/received via the overhead power line 2. Moreover, for example, it may be possible that the first control device 10 is mounted on an electric vehicle, the second control device 20 is installed at a station, and the warming-up operation is performed while the electric vehicle is stopped at the station.

Figure 3:
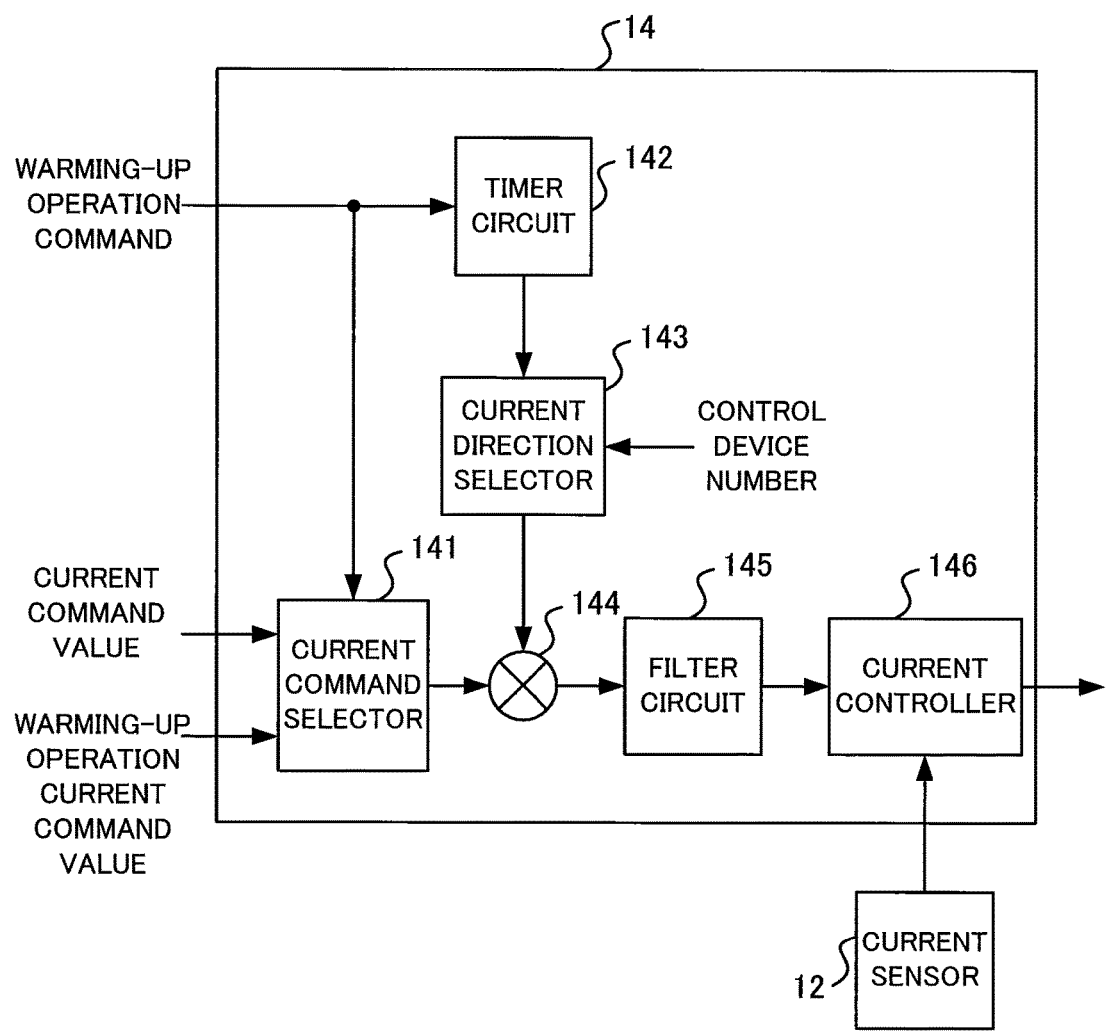
FIG. 3 is a block diagram illustrating an example configuration of a controller according to Embodiment 1.

FIG. 3 is a block diagram illustrating an example configuration of the controller according to Embodiment 1. The controller 14 and a controller 24 have the same configuration. Therefore, each of the components of the controller 14 is described. A current command selector 141 outputs a current command value when the current command selector 141 acquires no warming-up operation command, and when the current command selector 141 acquires a warming-up operation command, the current command selector 141 outputs a warming-up operation current command value. The current command value and the warming-up operation current command value may be entered from an external source or may be retained in the current command selector 141 in advance. The current command value is a command value of the output current of the converter 11 during the normal operation and determined based on the output current to the load device and a charge current of the power storage device 13. The current command value may be calculated by, for example, an inverter controller controlling the inverter 6. The warming-up operation current command value is a command value of the output current of the converter 11 during the warming-up operation and a value predetermined according to properties of the power storage device 13.

When a timer circuit 142 acquires a warming-up operation command, the timer circuit 142 starts counting up and outputs a signal H11 to a current direction selector 143. The signal H11 is a signal indicating switching between charge and discharge. For example, the signal H11 has a value of 1 or −1 with the initial value of 1. When the counted value reaches a threshold, the timer circuit 142 inverts the sign of the signal H11, resets the counted value, and restarts counting up. Any threshold may be set. The timer circuits 142 provided individually to the controllers 14 and 24 may synchronize with each other or may operate independently. Moreover, the controllers 14 and 24 may share a common timer circuit 142.

The current direction selector 143 outputs a signal H21 having a value of 1 while the warming-up operation is not in progress. For example, when the signal H11 is not output, the current direction selector 143 outputs the signal H21 having a value of 1. During the warming-up operation, the current direction selector 143 multiplies the signal H11 by 1 or −1 based on a control device number that is a number uniquely identifying the control device and outputs the multiplication result as the signal H21. For example, it is assumed that a control device number of 1 indicates the first control device 10 and a control device number of 2 indicates the second control device 20. When the signal H11 is output in 1 or −1 and the control device number is 1, the current direction selector 143 multiplies the signal H11 by 1 and outputs the multiplication result as the signal H21. Furthermore, when the signal H11 is output in 1 or −1 and the control device number is 2, the current direction selector 143 multiplies the signal H11 by −1 and outputs the multiplication result as the signal H21.

A multiplier 144 multiplies the current command value or the warming-up operation current command value output by the current command selector 141, by the signal H21 output by the current direction selector 143 and outputs the multiplication result. A filter circuit 145 is provided with, for example, a first-order lag element having a time constant of approximately one second and a ramp function of approximately one second, whereby a change rate of the output of the filter circuit 145 is maintained in a prescribed range even if the output of the multiplier 144 abruptly changes. Provision of the filter circuit 145 makes it possible to maintain the change rate of the output current of the converter 11 in a prescribed range. As the direction of the output current of the converter 11 is instantaneously switched, the operation of the first control device 10 becomes unstable. However, provision of the filter circuit 145 leads to stabilizing the operation of the first control device 10.

A current controller 146 performs feedback control based on the output of the filter circuit 145 and the output current of the converter 11 acquired from the current sensor 12 so that the output current of the converter 11 approaches the output of the filter circuit 145. The current controller 146 outputs a gate signal controlling the on/off of the switching element possessed by the converter 11.

Figure 4:
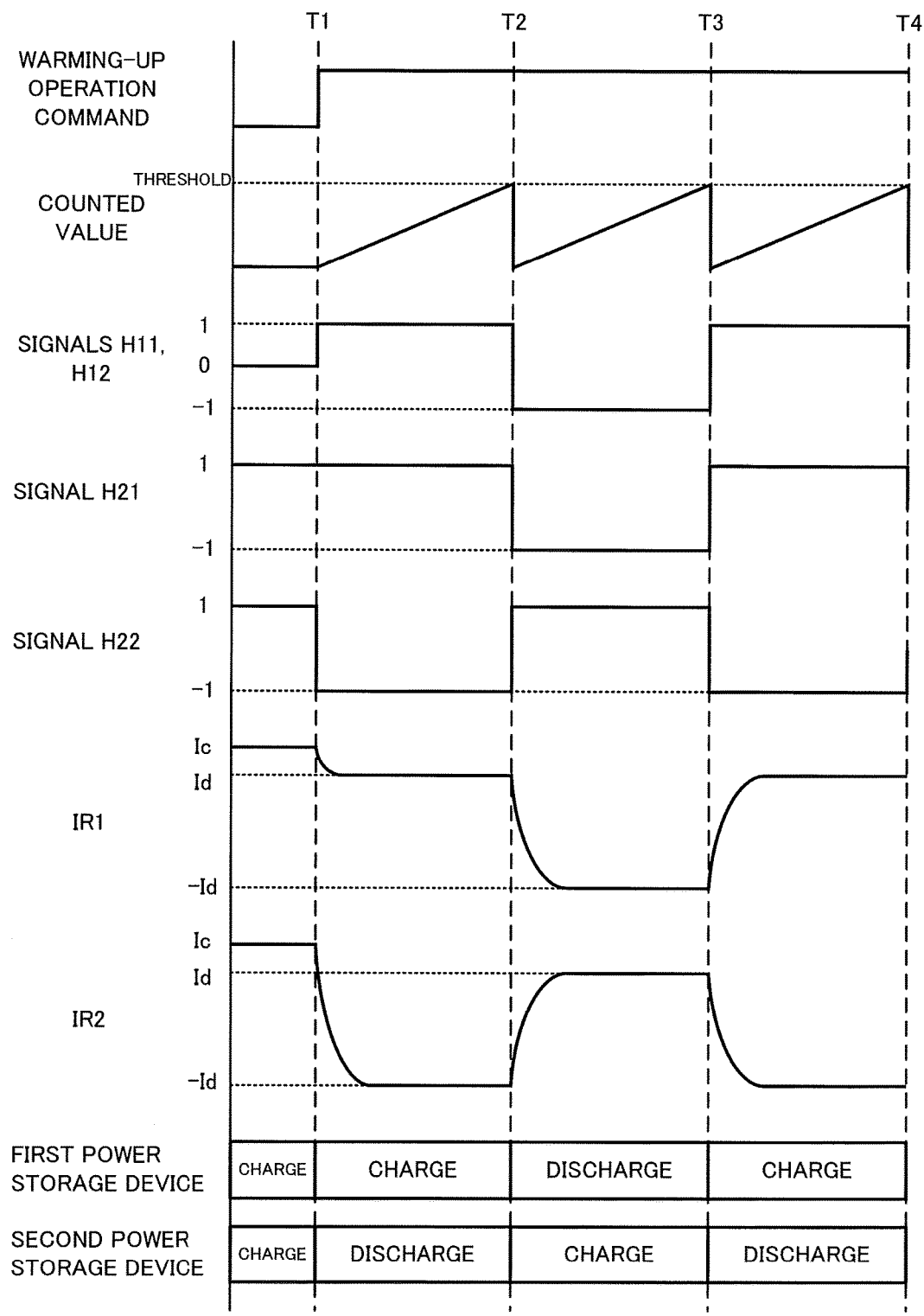
FIG. 4 is a timing chart illustrating an example charge-discharge control operation executed by the charge-discharge control device according to Embodiment 1.

FIG. 4 is a timing chart illustrating an exemplary charge-discharge control operation executed by the charge-discharge control device according to Embodiment 1. The warming-up operation, when a warming-up operation command is acquired at a time T1, is described. In FIG. 4, the power storage device 13 is denoted as the first power storage device and the power storage device 23 is denoted as the second power storage device. In the example of FIG. 4, the load devices connected to the charge-discharge control device 1, for example the inverters 6 and 7 and the like, are at halt and the power consumption of the load devices is sufficiently low in value.

The timer circuits 142 provided individually to the controllers 14 and 24 acquire a warming-up operation command at a time T1, start counting up, and output signals H11 and H12. It is assumed that the signal output by the timer circuit 142 of the controller 14 is the signal H11 and the signal output by the timer circuit 142 provided to the controller 24 is the signal H12. The signals H11 and H12 have the same value. The outputs of the signals H11 and H12 starts at the time T1 and the signals H11 and H12 have an initial value of 1 from the time T1 to a time T2. The counted value reaches a threshold at the time T2; therefore, the sign of the signals H11 and H12 is inverted and the signals H11 and H12 have a value of −1 from the time T2 to a time T3. The counted value reaches the threshold at the time T3; therefore, the sign of the signals H11 and H12 is inverted and the signals H11 and H12 have a value of 1 from the time T3 to a time T4.

Since the signal H11 is not output until the time T1, the current direction selector 143 provided to the controller 14 outputs the signal H21 having a value of 1. After the time T1, the current direction selector 143 provided to the controller 14 outputs the result of multiplying the signal H11 by 1 as the signal H21. Since the signal H12 is not output until the time T1, the current direction selector 143 provided to the controller 24 outputs the signal H22 having a value of 1. After the time T1, the current direction selector 143 provided to the controller 24 outputs the result of multiplying the signal H12 by −1 as the signal H22.

The current command selectors 141 provided to the controllers 14 and 24 output a current command value Ic until the time T1 and output a warming-up operation current command value Id after the time T1. The multipliers 144 provided to the controllers 14 and 24 each output the result of multiplying the current command value Ic by the signal H21 and H22 until the time T1 and output the result of multiplying the warming-up operation current command value Id by the signal H21 and H22 after the time T1. The current command value Ic is determined according to the charge current of the power storage devices 13 and 23 and the warming-up operation current command value Id is determined according to properties of the power storage devices 13 and 23 during the charge-discharge. In the example of FIG. 4, the current command value Ic is greater than the warming-up operation current command value Id. However, the current command value Ic may be equal to or less than the warming-up operation current command value Id. In the example of FIG. 4, the load devices are at halt. However, when the load devices are in operation, the output currents to the load devices are each superimposed on the current command value Ic and the warming-up operation current command value Id.

The output IR1 of the filter circuit 145 provided to the controller 14 has a value of Ic until the time T1, decreases from Ic to Id after the time T1, decreases from Id to −Id after the time T2, and increases from −Id to Id after the time T3. The output IR2 of the filter circuit 145 provided to the controller 24 has a value of Ic until the time T1, decreases from Ic to −Id after the time T1, increases from −Id to Id after the time T2, and decreases from Id to −Id after the time T3.

The current controller 146 provided to the controller 14 feedback-controls the converter 11 based on the output IR1 of the filter circuit 145 and the output of the current sensor 12. The current controller 146 provided to the controller 24 feedback-controls the converter 21 based on the output IR2 of the filter circuit 145 and the output of the current sensor 22. Consequently, the output current of the converter 11 approaches the output IR1 of the filter circuit 145 provided to the controller 14 and the output current of the converter 21 approaches the output IR2 of the filter circuit 145 provided to the controller 24.

As a result of the above-described charge-discharge control operation, the power storage device 23 (the second power storage device) discharges and the power storage device 13 (the first power storage device) is charged with the discharged power from the time T1 to the time T2. The power storage device 13 discharges and the power storage device 23 is charged with the discharged power from the time T2 to the time T3. The power storage device 23 discharges and the power storage device 13 is charged with the discharged power from the time T3 to the time T4. As the power storage devices 13 and 23 repeatedly charge/discharge as described above, power is given/received between the power storage devices 13 and 23. Heat is produced due to internal resistance loss of the power storage devices 13 and 23 and the temperatures of the power storage devices 13 and 23 rise.

The charge-discharge control device 1 ends the warming-up operation when, for example, the temperatures of the power storage devices 13 and 23 each reach a threshold. The warming-up operation may end at any moment and the warming-up operation may end after performing the warming-up operation for a given length of time. The warming-up operation may be repeated intermittently. If the temperatures of the power storage devices 13 and 23 each reach a threshold at, for example, a time between the time T1 and the time T2 in FIG. 4 during the first warming-up operation, the charge-discharge control device 1 may end the warming-up operation at the time T2. The charge-discharge control device 1 may perform the warming-up operation to discharge the power storage device 13 and charge the power storage device 23 in the next warming-up operation. Moreover, for example, the charge-discharge control device 1 may start the warming-up operation while the load devices are at halt and suspend the warming-up operation for operating the load devices. Then, after the load devices become at halt, the charge-discharge control device 1 may resume the warming-up operation. Upon resuming the warming-up operation, the charge-discharge control device 1 may charge the power storage device 13 or 23 that is being charged at the time of suspension and discharge the power storage device 13 or 23 that is being discharged at the time of suspension. In such a case, the states of the power storage devices 13 and 23 at the time of suspension, being charged or discharged, are stored in a storage device.

Figure 5:
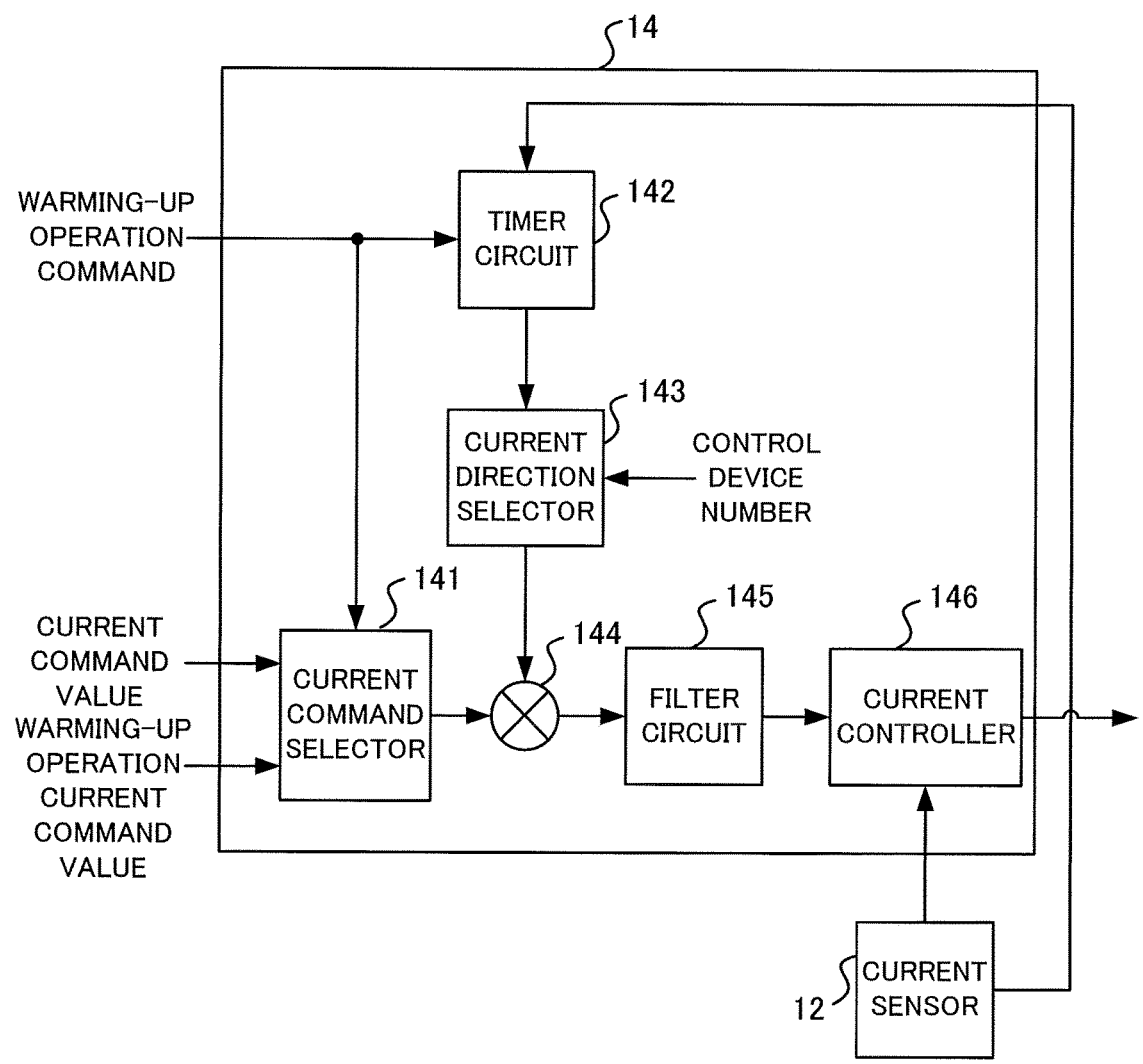
FIG. 5 is a block diagram illustrating another example configuration of the controller according to Embodiment 1.

In the above example, charge time and the discharge time are equal. However, the charge time and the discharge time may be different. FIG. 5 is a block diagram illustrating another example configuration of the controller according to Embodiment 1. The timer circuit 142 provided to the controller 14 receives the output current of the converter 11 from the current sensor 12 and determines whether the power storage device 13 is being charged or discharged based on the sign of the output current of the converter 11. The controller 14 may use, for example, a first threshold and a second threshold different from the first threshold, and perform the discharge until the discharge time reaches the first threshold when discharging the power storage device 13 and perform the charge until the charge time reaches the second threshold when charging the power storage device 13.

Operation of the controller 14 when the charge time is set longer than the discharge time using a first threshold and a second threshold greater than the first threshold is described. Operation of the controller 14 when the power storage device 13 is charged is described. When the counted value reaches the second threshold while the power storage device 13 is charged, the timer circuit 142 inverts the sign of the signal H11, resets the counted value, and restarts counting up. The processing of the current command selector 141 and the processing of the multiplier 144 and subsequent ones are the same as the above-described example.

Operation of the controller 14 when the power storage device 13 discharges is described. When the counted value reaches the first threshold while the power storage device 13 discharges, the timer circuit 142 notifies the current direction selector 143 of the end of the discharge time. The timer circuit 142 continues to count up after the counted value reaches the first threshold and when the counted value reaches the second value, inverts the sign of the signal H11, resets the counted value, and restarts counting up. When notified of the end of the discharge time by the timer circuit 142, the current direction selector 143 sets the value of the signal H21 to zero regardless of the value of the signal H11. As a result, the power storage device 13 is neither charged nor discharged until the counted value reaches the second threshold since the counted value has reached the first threshold. The processing of the current command selector 141 and the processing of the multiplier 144 and subsequent ones are the same as the above-described example.

In the above-described example, the discharge of the power storage devices 13 and 23 are performed until the discharge time reaches the first threshold, and the power storage devices 13 and 23 are charged until the charge time reaches the second threshold. For example, the charge time and discharge time of the power storage device 13 may be different. In some cases, an auxiliary power source device supplying power to a lighting equipment, air-conditioning equipment, or the like of the electric vehicle may be provided in parallel to the inverter 6 shown in FIG. 2. In such a case, power is supplied from the power storage device 13 to the auxiliary power source device on non-electrified routes. With the charge time of the power storage device 13 made longer than the discharge time as in the above-described example, the power corresponding to the power supplied from the power storage device 13 to the auxiliary power source device is stored in the power storage device 13, whereby it is possible to prevent the amount of electricity stored in the power storage device 13 to which the auxiliary power source device is connected from being significantly reduced. The difference between the charge time and discharge time of the power storage device 13 can be determined according to the power consumption at the auxiliary power source device.

As described above, the charge-discharge control device 1 according to Embodiment 1 repeatedly charges and discharges the power storage devices 13 and 23 at given intervals so that power is given/received between the power storage devices 13 and 23, whereby it is possible to raise the temperatures of the power storage devices 13 and 23 with a more simplified configuration. Moreover, it is possible to prevent the amounts of charge in the power storage devices 13 and 23 from being one-sided by switching the power storage devices 13 and 23 between charge and discharge as described above.

Embodiment 2

Figure 6:
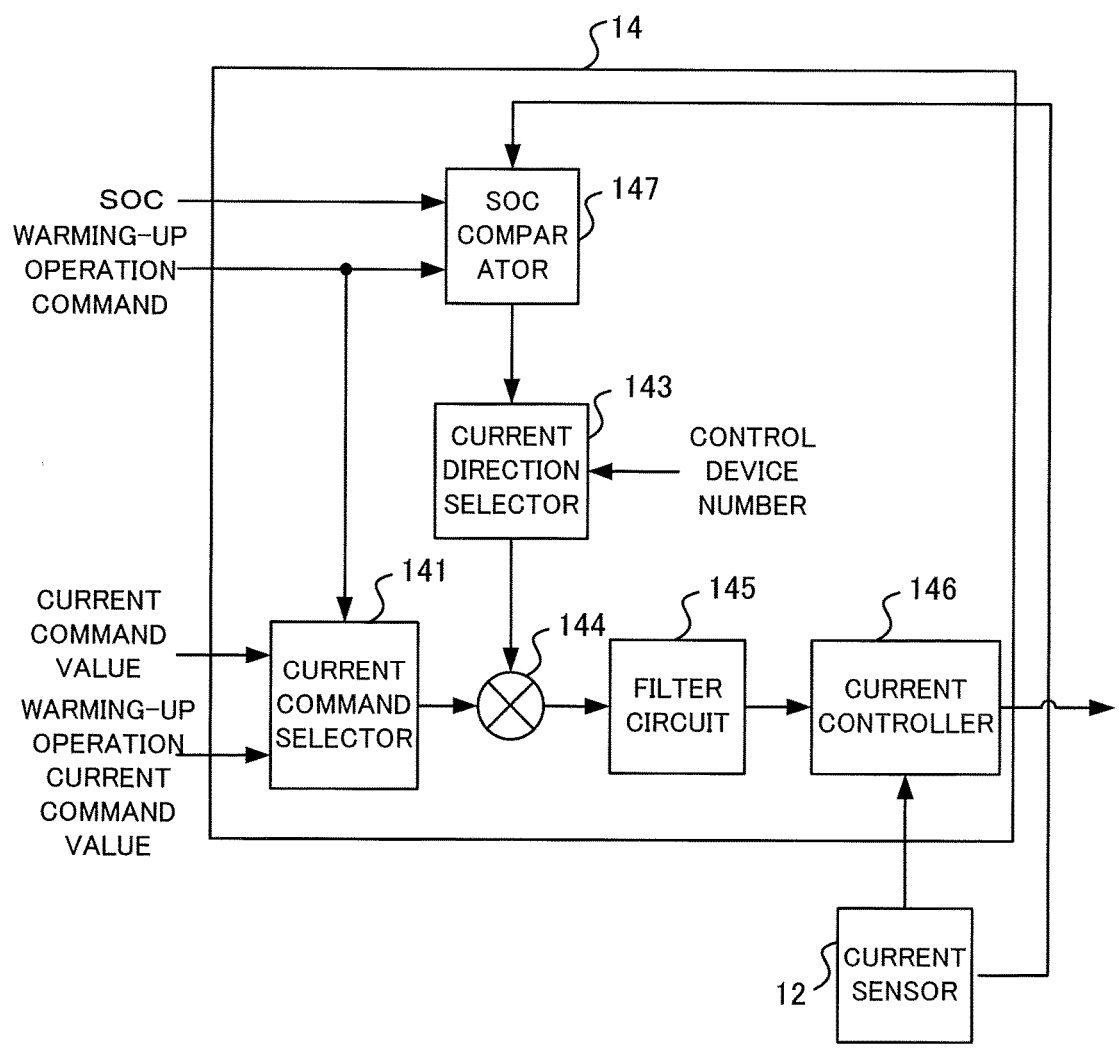
FIG. 6 is a block diagram illustrating an example configuration of the controller according to Embodiment 2 of the present disclosure.

FIG. 6 is a block diagram illustrating an example configuration of the controller according to Embodiment 2 of the present disclosure. The controllers 14 and 24 according to Embodiment 2 switch the power storage devices 13 and 23 between charge and discharge based on a state of charge (SOC) of the charging power storage device 13 or 23. Operation of the controller 14 different from Embodiment 1 is described below. The controller 14 according to Embodiment 2 includes an SOC comparator 147 in place of the timer circuit 142. The SOC comparator 147 receives input of an SOC of the power storage device 13. Any method of calculating the SOC of the power storage device 13 may be used and, for example, the SOC is calculated from the relationship between the open voltage and the SOC. Here, the SOC comparator 147 may calculate the SOC.

When the SOC comparator 147 acquires a warming-up operation command, the SOC comparator 147 outputs to the current direction selector 143 the same signal H11 as in Embodiment 1. The SOC comparator 147 repeatedly compares the SOC with a threshold with a predetermined timing while the power storage device 13 is charged and when the SOC reaches the threshold, inverts the sign of the signal H11. Any threshold may be set and comparing the SOC with the threshold may be performed at any timing. The SOC comparator 147 receives the output current of the converter 11 from the current sensor 12 and determines whether the power storage device 13 is being charged or discharged based on the sign of the output current of the converter 11.

The SOC comparators 147 provided individually to the controllers 14 and 24 give notice to each other as to when to invert the sign of the signals H11 and H12. While the power storage device 13 is charged, the SOC comparator 147 provided to the controller 14 repeatedly compares the SOC of the power storage device 13 with a threshold and when the SOC reaches the threshold, notifies the SOC comparator 147 provided to the controller 24 of signal switching. With this notice of signal switching, the sign of the signal H11 output by the SOC comparator 147 provided to the controller 14 and signal H12 output by the SOC comparator 147 provided to the controller 24 is inverted. Similarly, while the power storage device 23 is charged, the SOC comparator 147 provided to the controller 24 repeatedly compares the SOC of the power storage device 23 with a threshold and when the SOC reaches the threshold, notifies the SOC comparator 147 provided to the controller 14 of signal switching.

Figure 7:
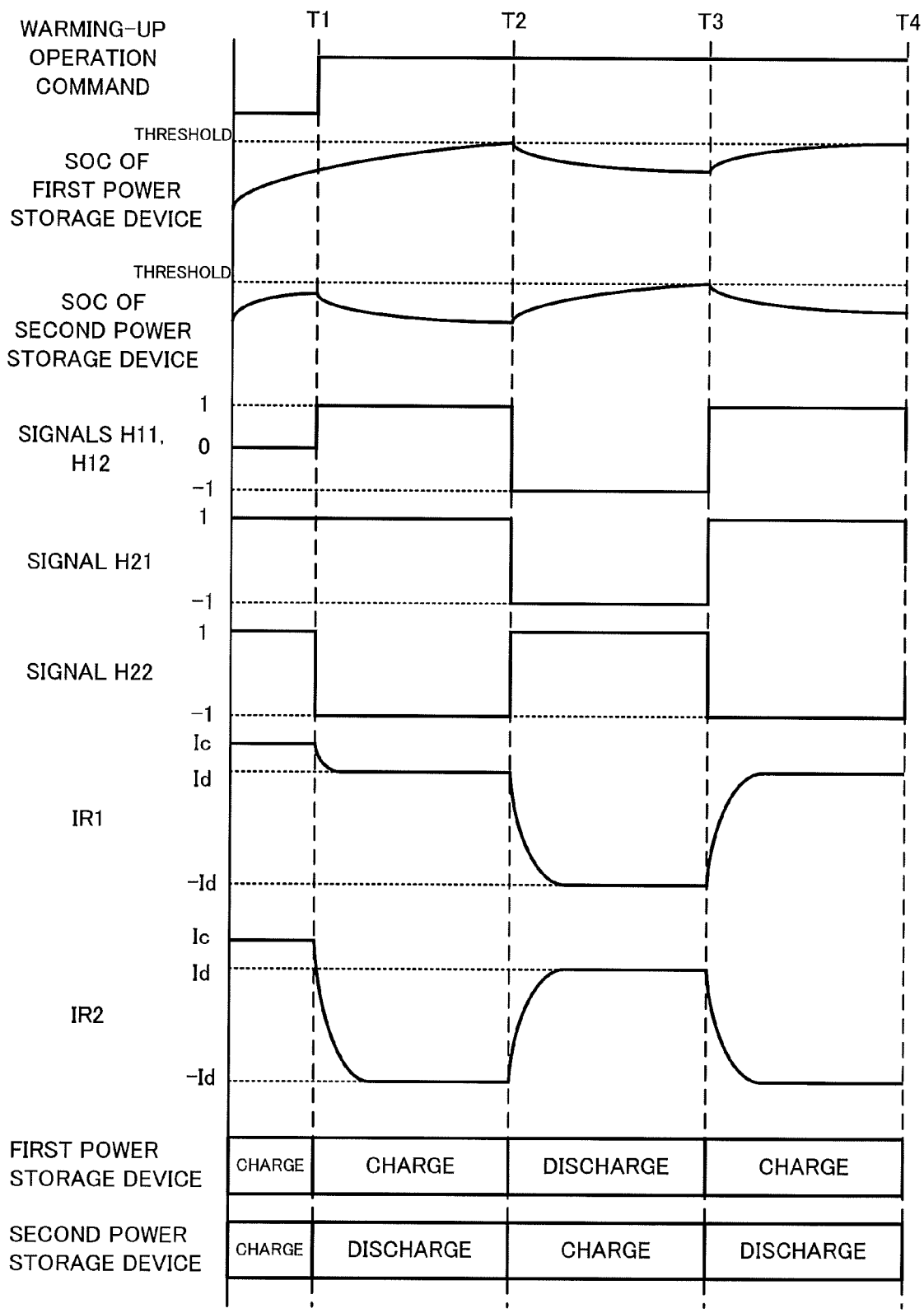
FIG. 7 is a timing chart illustrating an example charge-discharge control operation executed by the charge-discharge control device according to Embodiment 2.

Operation in the warming-up operation executed by the charge-discharge control device 1 is described. FIG. 7 is a timing chart illustrating an example charge-discharge control operation executed by the charge-discharge control device according to Embodiment 2. The way of reading the chart is the same as FIG. 4.

The SOC comparators 147 provided individually to the controllers 14 and 24 acquire a warming-up operation command at a time T1 and output signals H11 and H12. Since the SOC comparators 147 provided to the controllers 14 and 24 give notice of signal switching to each other, the signals H11 and H12 have the same value. The output of the signals H11 and H12 starts at the time T1 and the signals H11 and H12 have an initial value of 1 from the time T1 to a time T2. At the time T2, the SOC comparator 147 provided to the controller 14 detects the SOC of the power storage device 13 being charged having reached a threshold and notifies the SOC comparator 147 provided to the controller 24 of signal switching; then, the sign of the signals H11 and H12 is inverted. The signals H11 and H12 have a value of −1 from the time T2 to a time T3. At the time T3, the SOC comparator 147 provided to the controller 24 detects the SOC of the charging power storage device 23 having reached a threshold and notifies the SOC comparator 147 provided to the controller 14 of signal switching; then, the sign of the signals H11 and H12 is inverted. The signals H11 and H12 have a value of 1 from the time T3 to a time T4. The processing of the current direction selector 143 and subsequent ones is the same as in Embodiment 1.

As a result of the above-described charge-discharge control operation, the power storage device 23 (the second power storage device) discharges and the power storage device 13 (the first power storage device) is charged with the discharged power from the time T1 to the time T2. The power storage device 13 discharges and the power storage device 23 is charged with the discharged power from the time T2 to the time T3. The power storage device 23 discharges and the power storage device 13 is charged with the discharged power from the time T3 to the time T4. As the power storage devices 13 and 23 repeatedly charge/discharge as described above, power is given/received between the power storage devices 13 and 23. Heat is produced due to internal resistance loss of the power storage devices 13 and 23 and the temperatures of the power storage devices 13 and 23 rise. The charging ends when the SOC of the power storage device 13 or 23 being charged reaches a threshold, whereby it is possible to raise the temperatures of the power storage devices 13 and 23 while suppressing overcharge of the power storage devices 13 and 23.

As described above, the charge-discharge control device 1 according to Embodiment 2 switches the power storage devices 13 and 23 between charge and discharge each time the SOC of the charging power storage device 13 or 23 reaches a threshold so that power is given/received between the power storage devices 13 and 23, whereby it is possible to raise the temperatures of the power storage devices 13 and 23 with a more simplified configuration. Moreover, it is possible to raise the temperatures of the power storage devices 13 and 23 while suppressing overcharge of the power storage devices 13 and 23.

Embodiment 3

Figure 8:
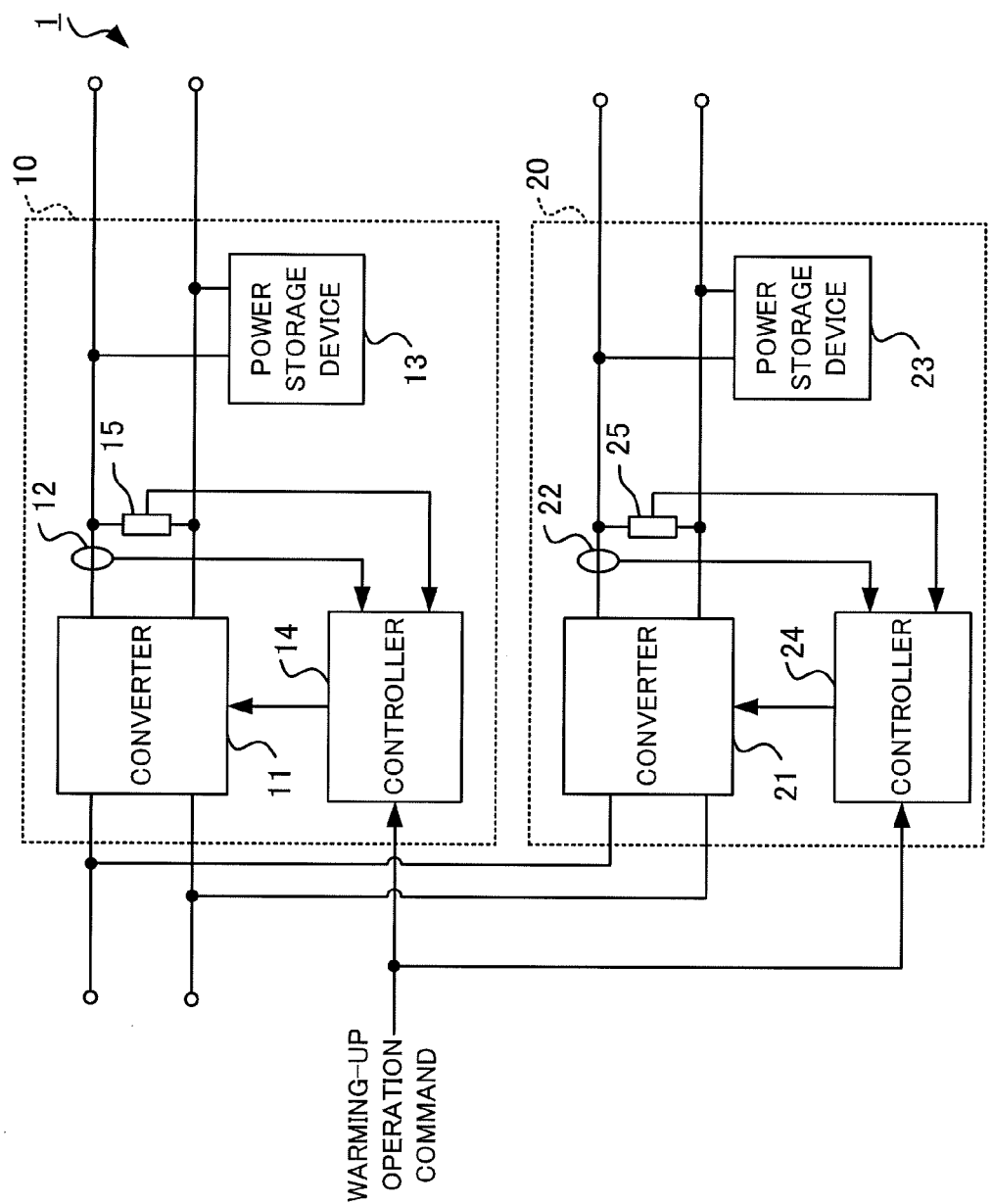
FIG. 8 is a block diagram illustrating an example configuration of the charge-discharge control device according to Embodiment 3 of the present disclosure.

FIG. 8 is a block diagram illustrating an example configuration of the charge-discharge control device according to Embodiment 3 of the present disclosure. The charge-discharge control device 1 according to Embodiment 3 includes a voltage sensor 15 acquiring a voltage of the power storage device 13 and a voltage sensor 25 acquiring the voltage of the power storage device 23 in addition to the configuration of the charge-discharge control device 1 according to Embodiment 1.

Figure 9:
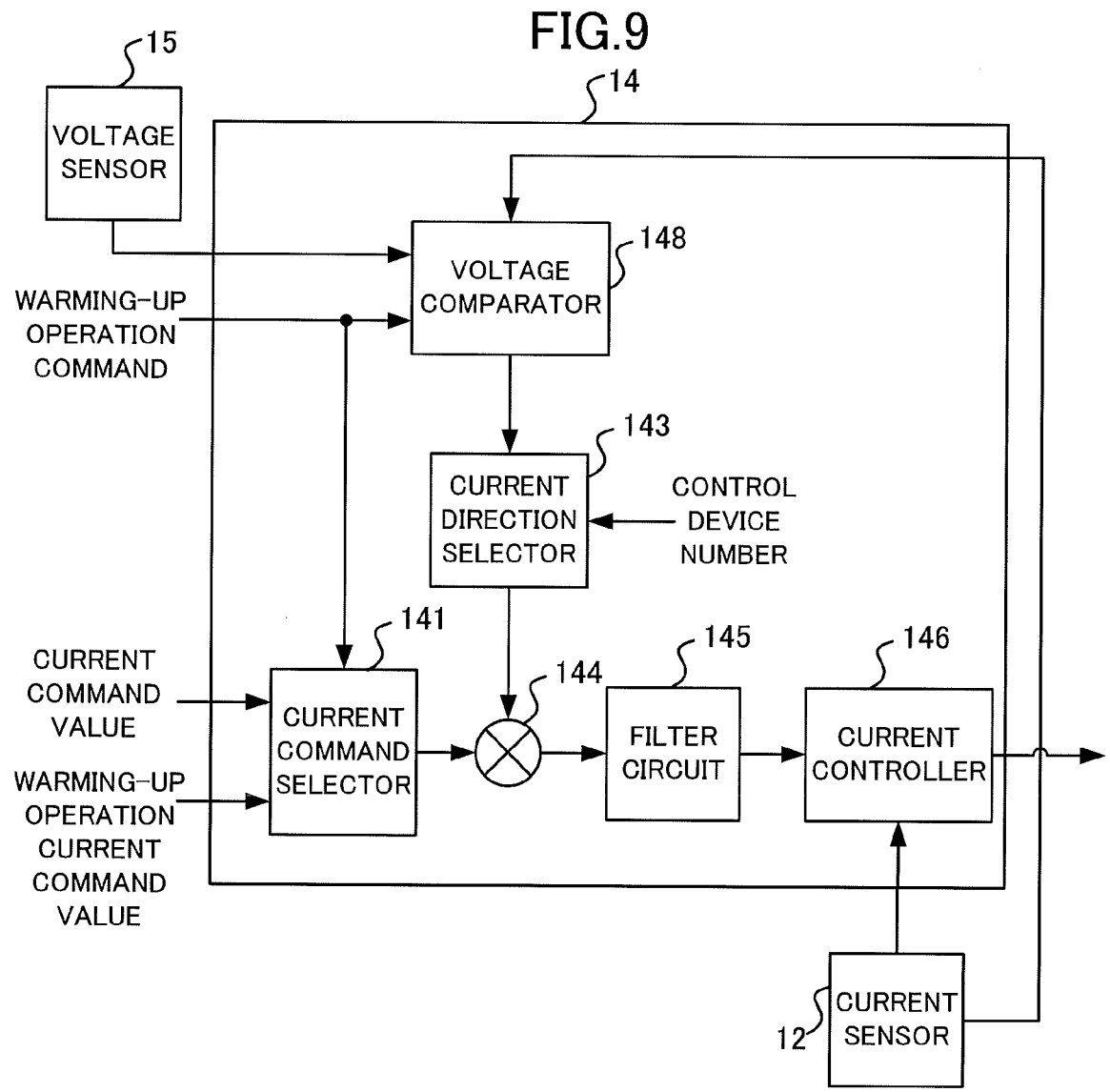
FIG. 9 is a block diagram illustrating an example configuration of the controller according to Embodiment 3.

FIG. 9 is a block diagram illustrating an example configuration of the controller according to Embodiment 3. The controllers 14 and 24 according to Embodiment 3 switch the power storage devices 13 and 23 between charge and discharge based on the voltage of the power storage device 13 or 23 being charged. Operation of the controller 14 different from Embodiment 1 is described below. The controller 14 according to Embodiment 3 includes a voltage comparator 148 in place of the timer circuit 142. The voltage comparator 148 acquires the voltage of the power storage device 13 from the voltage sensor 15.

When the voltage comparator 148 acquires a warming-up operation command, the voltage comparator 148 outputs to the current direction selector 143 the same signal H11 as in Embodiment 1. The voltage comparator 148 repeatedly compares the voltage of the power storage device 13 with a threshold with a predetermined timing while the power storage device 13 is charged and when the voltage reaches the threshold, inverts the sign of the signal H11. Any threshold may be set and comparing the voltage of the power storage device 13 with the threshold may be performed at any timing. The voltage comparator 148 receives the output current of the converter 11 from the current sensor 12 and determines whether the power storage device 13 is being charged or discharged based on the sign of the output current of the converter 11.

The voltage comparators 148 provided individually to the controllers 14 and 24 give notice to each other as to when to invert the sign of the signals H11 and H12. While the power storage device 13 is charged, the voltage comparator 148 provided to the controller 14 repeatedly compares the voltage of the power storage device 13 with a threshold and when the voltage reaches the threshold, notifies the voltage comparator 148 provided to the controller 24 of signal switching. With this notice of signal switching, the sign of the signal H11 output by the voltage comparator 148 provided to the controller 14 and signal H12 output by the voltage comparator 148 provided to the controller 24 is inverted. Similarly, while the power storage device 23 is charged, the voltage comparator 148 provided to the controller 24 repeatedly compares the voltage of the power storage device 23 with a threshold and when the voltage reaches the threshold, notifies the voltage comparator 148 provided to the controller 14 of signal switching.

Figure 10:
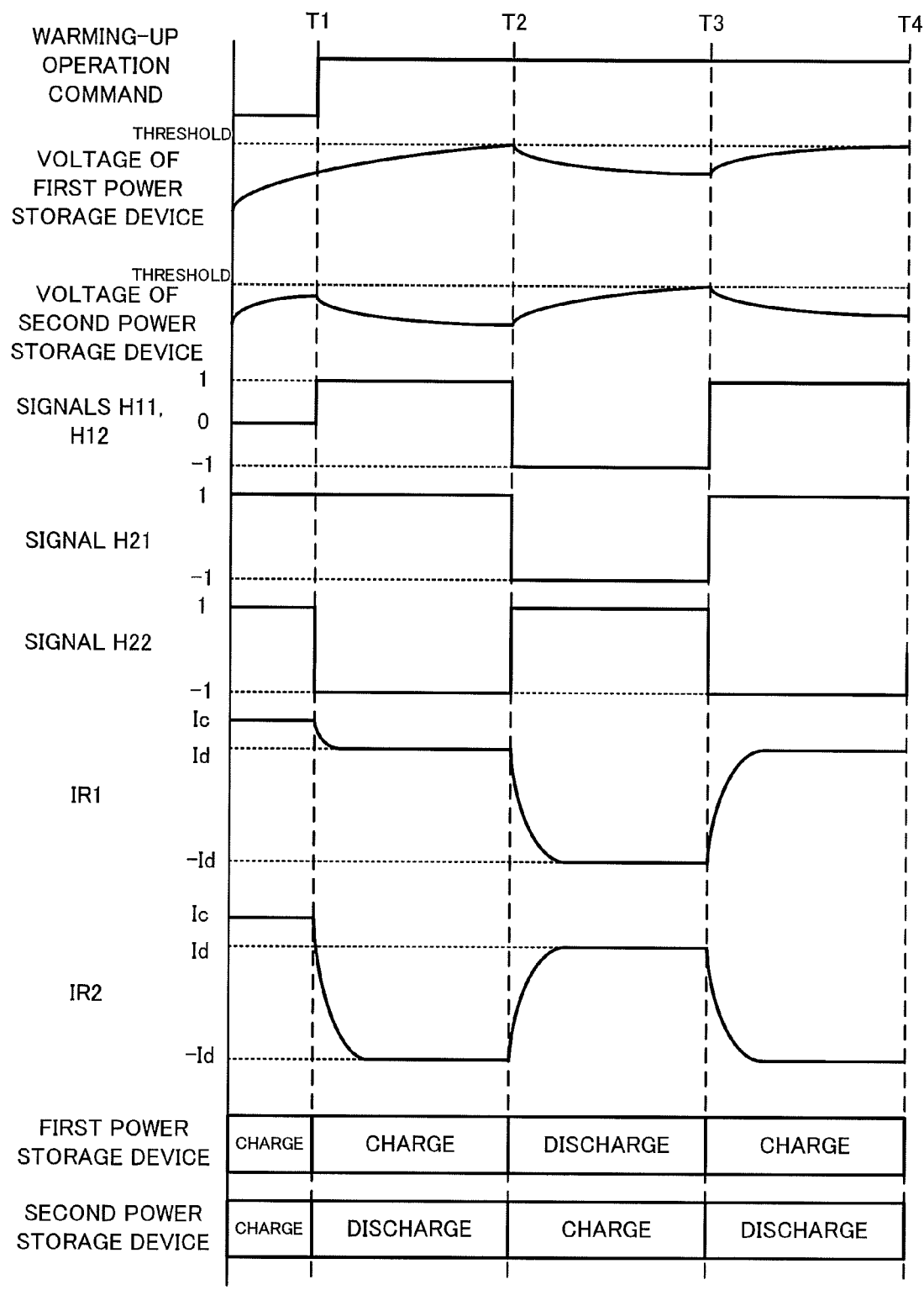
FIG. 10 is a timing chart illustrating an example charge-discharge control operation executed by the charge-discharge control device according to Embodiment 3.

Operation in the warming-up operation executed by the charge-discharge control device 1 is described. FIG. 10 is a timing chart illustrating an example charge-discharge control operation executed by the charge-discharge control device according to Embodiment 3. The way of reading the chart is the same as FIG. 4.

The voltage comparators 148 provided individually to the controllers 14 and 24 acquire a warming-up operation command at a time T1 and output signals H11 and H12. Since the voltage comparators 148 provided to the controllers 14 and 24 give notice of signal switching to each other, the signals H11 and H12 have the same value. The output of the signals H11 and H12 starts at the time T1 and the signals H11 and H12 have an initial value of 1 from the time T1 to a time T2. At the time T2, the voltage comparator 148 provided to the controller 14 detects the voltage of the charging power storage device 13 having reached a threshold and notifies the voltage comparator 148 provided to the controller 24 of signal switching; then, the sign of the signals H11 and H12 is inverted. The signals H11 and H12 have a value of −1 from the time T2 to a time T3. At the time T3, the voltage comparator 148 provided to the controller 24 detects the voltage of the charging power storage device 23 having reached a threshold and notifies the voltage comparator 148 provided to the controller 14 of signal switching; then, the sign of the signals H11 and H12 is inverted. The signals H11 and H12 have a value of 1 from the time T3 to a time T4. The processing of the current direction selector 143 and subsequent ones is the same as in Embodiment 1.

As a result of the above-described charge-discharge control operation, the power storage device 23 (the second power storage device) discharges and the power storage device 13 (the first power storage device) is charged with the discharged power from the time T1 to the time T2. The power storage device 13 discharges and the power storage device 23 is charged with the discharged power from the time T2 to the time T3. The power storage device 23 discharges and the power storage device 13 is charged with the discharged power from the time T3 to the time T4. As the power storage devices 13 and 23 repeatedly charge/discharge as described above, power is given/received between the power storage devices 13 and 23. Heat is produced due to internal resistance loss of the power storage devices 13 and 23 and the temperatures of the power storage devices 13 and 23 rise. The charging ends when the voltage of the power storage device 13 or 23 being charged reaches a threshold, whereby it is possible to raise the temperatures of the power storage devices 13 and 23 while suppressing overcharge of the power storage devices 13 and 23.

As described above, the charge-discharge control device 1 according to Embodiment 3 switches the power storage devices 13 and 23 between charge and discharge each time the voltage of the charging power storage device 13 or 23 reaches a threshold so that power is given/received between the power storage devices 13 and 23, whereby it is possible to raise the temperatures of the power storage devices 13 and 23 with a more simplified configuration. Moreover, it is possible to raise the temperatures of the power storage devices 13 and 23 while suppressing overcharge of the power storage devices 13 and 23.

Embodiments of the present disclosure are not restricted to the above-described embodiments and can be configured by any combination of multiple modes of the above-described embodiments. For example, Embodiments 1 and 2 may be combined so that the power storage devices 13 and 23 are switched between charge and discharge when the SOC of the power storage device 13 or 23 being charged reaches a threshold or when the charge time and discharge time of the power storage devices 13 and 23 reach a given time. In such a case, even if the calculated value of the SOC is erroneous, the charge-discharge is switched after a given time elapses, whereby it is possible to prevent overcharge of the power storage devices 13 and 23.

Embodiments 1 and 3 may be combined so that the power storage devices 13 and 23 are switched between charge and discharge when the voltage of the power storage device 13 or 23 being charged reaches a threshold or when the charge time and discharge time of the power storage devices 13 and 23 reach a given time. In such a case, even if an error occurs in the voltage sensor 15, the charge-discharge is switched after a given time elapses, whereby it is possible to prevent overcharge of the power storage devices 13 and 23.

Embodiments 2 and 3 may be combined so that the power storage devices 13 and 23 are switched between charge and discharge when the SOC of the power storage device 13 or 23 being charged reaches a threshold or when the charge time and discharge time of the power storage device 13 or 23 reaches a given time. Moreover, Embodiments 1, 2, and 3 may be combined so that the power storage devices 13 and 23 are switched between charge and discharge when the voltage of the charging power storage device 13 or 23 reaches a threshold, when the SOC of the power storage device 13 or 23 being charged reaches a threshold, or when the charge time and discharge time of the power storage devices 13 and 23 reaches a given time.

The number of power converters and the number of power storage devices are any value of two or greater. The charge-discharge control device 1 performs the warming-up operation to discharge at least one power storage device and charge at least one other power storage device using the power discharged from that power storage device among multiple power storage devices. The power storage devices may be charged or discharged in any order so as to repeatedly perform the warming-up operation while changing at least any of the power storage devices among the power storage devices to discharge and the power storage devices to charge.

The number of power storage devices may be an odd number. When there are three power storage devices, for example, it may be possible to discharge a first power storage device and charge a second power storage device and then discharge the second power storage device and charge a third power storage device. Moreover, it may be possible to discharge a first power storage device and charge a second power storage device and a third power storage device and then discharge the second power storage device and charge the first power storage device and the third power storage device. The discharge and charge are not one-sided by changing the power storage devices to discharge and the power storage devices to charge in a cyclic order as stated above.

When the number of power storage devices is an even number, the control is facilitated by charging half the number of power storage devices and discharging the remaining half the number of power storage devices and then switching the power storage devices between charge and discharge.

The function of the controllers 14 and 24 may be incorporated as a partial function of a vehicle information control device. Moreover, the above-described configuration of the controllers 14 and 24 is given by way of example. The controllers 14 and 24 are any circuit capable of controlling the output currents of the converters 11 and 21 based on the warming-up operation command and charge-discharge time, SOC, or voltage of the power storage devices 13 and 23.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The present disclosure is preferably used in charge-discharge control devices controlling the charge-discharge of power storage devices.

REFERENCE SIGNS LIST

1 Charge-discharge control device
2 Overhead power line
3 Current collector
4 Wheel
5 Rail
6, 7 Inverter
8, 9 Electric motor
10 First control device
11, 21 Converter
12, 22 Current sensor
13, 23 Power storage device
14, 24 Controller
15, 25 Voltage sensor
20 Second control device
141 Current command selector
142 Timer circuit
143 Current direction selector
144 Multiplier
145 Filter circuit
146 Current controller
147 SOC comparator
148 Voltage comparator

The invention claimed is:

1. A charge-discharge control device, comprising:
a plurality of power converters capable of two-way power conversion to an input side of which a power source is connected and of which positive electrodes on the input side are connected to each other and negative electrodes on the input side are connected to each other;
a plurality of power storage devices connected to an output side of the power converters and provided one for each of the power converters; and
a controller to charge or discharge a power storage device of the power storage devices connected to the power converters by controlling output currents of the power converters,
wherein the controller charges each of the power storage devices by supplying, to each of the power storage devices, power acquired from the power source via each of the power converters when the controller acquires no warming-up operation command, and when the controller acquires a warming-up operation command, the controller performs warming-up operation to discharge at least one of the power storage devices and charge at least one other of the power storage devices using power discharged from the at least one of the power storage device and repeatedly performs the warming-up operation while changing at least any of the power storage devices among the power storage devices to discharge and the power storage devices to charge.

2. The charge-discharge control device according to claim 1, wherein
when the controller acquires the warming-up operation command, the controller discharges the at least one of the power storage devices until a discharge time of the at least one of the power storage devices reaches a first threshold and charges the at least one other of the power storage devices until a charge time of the at least one other of the power storage device reaches a second threshold in the warming-up operation.

3. The charge-discharge control device according to claim 2, wherein
the first threshold is a value less than the second threshold and the controller charges the at least one other of the power storage devices using power discharged from the at least one of the power storage devices until the discharge time of the at least one of the power storage devices reaches the first threshold and after the discharge time of the at least one of the power storage devices reaches the first threshold, charges the at least one other of the power storage devices using power supplied from the power source connected to the at least one other of the power storage devices via the power converter until the charge time of the at least one other of the power storage devices reaches the second threshold.

4. The charge-discharge control device according to claim 1, wherein
when the controller acquires the warming-up operation command, the controller discharges the at least one of the power storage devices and charges the at least one other of the power storage devices until a state of charge of the at least one other of the power storage devices that is being charged reaches a threshold in the warming-up operation.

5. The charge-discharge control device according to claim 1, wherein
when the controller acquires the warming-up operation command, the controller discharges the at least one of the power storage devices and charges the at least one other of the power storage devices until a voltage of the at least one other of the power storage devices that is charging reaches a threshold in the warming-up operation.

6. The charge-discharge control device according to claim 1, wherein
a number of the power converters are an even number of power converters, and
when the controller acquires the warming-up operation command, the controller alternately repeats the warming-up operation to discharge half the number of power storage devices and charge the remaining half the number of power storage devices using power discharged from the half the number of power storage devices and the warming-up operation to discharge the remaining half the number of power storage devices and charge the half the number of power storage devices using power discharged from the remaining half the number of power storage devices.

7. The charge-discharge control device according to claim 1, wherein
the controller controls the output currents of the power converters while maintaining a change rate of the output currents of the power converters in a prescribed range.

8. A charge-discharge control device, comprising:
a plurality of power converters capable of two-way power conversion to an input side of which a power source is connected and of which positive electrodes on the input side are connected to each other and negative electrodes on the input side are connected to each other;
a plurality of power storage devices connected to an output side of the power converters and provided one for each of the power converters; and
a controller to charge or discharge a power storage device of the power storage devices connected to the power converters by controlling output currents of the power converters,
wherein the controller charges the power storage devices when the controller acquires no warming-up operation command, and when the controller acquires a warming-up operation command, the controller performs warming-up operation to discharge at least one of the power storage devices and charge at least one other of the power storage devices using power discharged from the at least one of the power storage devices and repeatedly performs the warming-up operation while changing at least any of the power storage devices among the power storage devices to discharge and the power storage devices to charge;
wherein when the controller acquires the warming-up operation command, the controller discharges the at least one of the power storage devices and charges the at least one other of the power storage devices using power discharged from the at least one of the power storage devices until a discharge time of the at least one of the power storage devices reaches a first threshold and after the discharge time of the at least one of the power storage devices reaches the first threshold, charges the at least one other of the power storage devices using power supplied from the power source connected to the at least one other of the power storage devices via the power converters until a charge time of the at least one other of the power storage device reaches a second threshold in the warming-up operation.

9. The charge-discharge control device according to claim 8, wherein
when the controller acquires the warming-up operation command, the controller discharges the at least one of the power storage devices and charges the at least one other of the power storage devices until a state of charge of the at least one other of the power storage devices that is being charged reaches a threshold in the warming-up operation.

10. The charge-discharge control device according to claim 8, wherein
when the controller acquires the warming-up operation command, the controller discharges the at least one of the power storage devices and charges the at least one other of the power storage devices until a voltage of the at least one other of the power storage devices that is charging reaches a threshold in the warming-up operation.

11. The charge-discharge control device according to claim 8, wherein
a number of the power converters are an even number of power converters, and
when the controller acquires the warming-up operation command, the controller alternately repeats the warming-up operation to discharge half the number of power storage devices and charge the remaining half the number of power storage devices using power discharged from the half the number of power storage devices and the warming-up operation to discharge the remaining half the number of power storage devices and charge the half the number of power storage devices using power discharged from the remaining half the number of power storage devices.

12. The charge-discharge control device according to claim 8, wherein
the controller controls the output currents of the power converters while maintaining a change rate of the output currents of the power converters in a prescribed range.

* * * * *